United States Patent [19]

Plasmati

[11] 4,206,157

[45] Jun. 3, 1980

[54] FLUID METERING DEVICE

[76] Inventor: Eustachio Plasmati, San Felice-Torre 1, Segrate, Italy

[21] Appl. No.: 886,757

[22] Filed: Mar. 15, 1978

[30] Foreign Application Priority Data

Nov. 10, 1977 [IT] Italy .............................. 29538 A/77

[51] Int. Cl.² ........................................... G05D 11/06
[52] U.S. Cl. ........................................ 261/59; 137/91;
261/70; 261/123; 261/127
[58] Field of Search ....................... 99/276, 277, 277.1;
137/91; 261/59, 64 R, 70, 123, 127; 426/15,
330.4, 330.5, 474

[56] References Cited

U.S. PATENT DOCUMENTS

| | | | |
|---|---|---|---|
| 795,847 | 8/1905 | McCool | 261/127 X |
| 1,942,859 | 1/1934 | Hickman | 137/91 |
| 2,543,522 | 2/1951 | Cohen | 137/91 |
| 3,429,676 | 2/1969 | Gatza | 261/123 X |
| 3,741,770 | 6/1973 | Van Olphen | 426/15 |
| 3,765,442 | 10/1973 | Nettles | 137/412 X |

FOREIGN PATENT DOCUMENTS 2046383  4/1972  Fed. Rep. of Germany ............. 137/91

*Primary Examiner*—Robert G. Nilson
*Attorney, Agent, or Firm*—Albert Josif; Lazar D. Wechsler

[57] ABSTRACT

Metering device for metering a fluid into a liquid to obtain a treatment liquid having variable physical parameters depending on the concentration of the fluid to be metered into the treatment liquid. The device comprises a container having an inlet for the liquid, an outlet for the treatment liquid and an inlet for the fluid to be metered. First valve means provided at the inlet for the liquid are effective to control the flow of the liquid into the container according to the level of the liquid in the container. Second valve means provided at the inlet for the fluid to be metered control the admittance of the fluid to the container. Means are provided for controlling the opening, and alternately the closing, of the second valve means and comprising a member responsive to the value of one of the physical parameters of the treatment liquid to alternately control the opening and the closing of the control means for the second valve means, according to the absence, or respectively presence, of a predetermined value of one of the physical parameters of the treatment liquid.

1 Claim, 5 Drawing Figures

4,206,157

FLUID METERING DEVICE

BACKGROUND OF THE INVENTION

This invention relates to a fluid metering device.

While this specification and claims refer, for simplicity and uniformity reasons, to sulphur dioxide as the gas to be metered and to water as the carrier fluid, since the preferred field of application of this invention is the wine-making art or oenology, in particular, and the field of beverage making, such as fruit juices, etc., in general, it will be apparent and obvious how the gas to be metered and carrier fluid can include other gases and fluids, or liquids, as desired.

The metering of sulphur dioxide is currently carried out either directly in the must or the like, or indirectly, the carrier fluid being water. Metering systems of this latter type utilize the fact that sulphur dioxide is soluble in water, and comprise a large tank or reservoir, whereinto water is poured first, followed by the bubbling of sulphur dioxide until the solution reaches an acceptable concentration. This operation requires several hours and, accordingly, is to be completed prior to the metering proper; generally, during the night hours. Consequently, the capacity of said tank must be quite considerable, such as to ensure self-sufficiency for the system throughout the working day. This disadvantages of such systems reside in that their operation is discontinuous, that they are scarcely suitable for an occasional use, since the solution, if stored up for too long a time tends to deteriorate, that it is necessary to prepare said solution each time it is needed, even though its use may be limited to a few minutes, and that their tanks, of stainless steel, are very expensive.

SUMMARY OF THE INVENTION

It is an object of this invention to provide a metering device of the general type mentioned in the preamble, which fully obviates the disadvantages described above, while eliminating the need for the prior storing of the acqueous solution.

Further objects of the invention are those of providing a metering device which is transportable, which eliminates any wastage of solution, which affords an easy adjustment of the solution, and moreover, is fully automated.

These and other objects of this invention are achieved by a metering device, according to the invention, for metering a fluid into a liquid to obtain a treatment liquid having variable physical parameters depending on the concentration of the fluid to be metered into the treatment liquid, comprising a container having an inlet for said liquid, an outlet for the treatment liquid, an inlet for the fluid to be metered, first valve means at said inlet for the liquid, effective to control the flow of said liquid into the container according to the level of the liquid in the container, second valve means at said inlet for the fluid to be metered to control the admittance of said fluid to the container, a means for controlling the opening, and alternately the closing, of said second valve means comprising a member responsive to the value of one of said physical parameters of the treatment liquid to alternately control the opening and the closing of said control means for the second valve means, according to the absence, or respectively presence, of a predetermined value of one of said physical parameters of the treatment liquid.

BRIEF DESCRIPTION OF THE DRAWINGS

Further features, advantages and details of the metering device according to the invention, will be apparent from the following description of some preferred embodiments thereof, schematically illustrated in the accompanying drawings, where.

DESCRIPTION OF THE PREFERRED EMBODIMENTS

Figure 2:
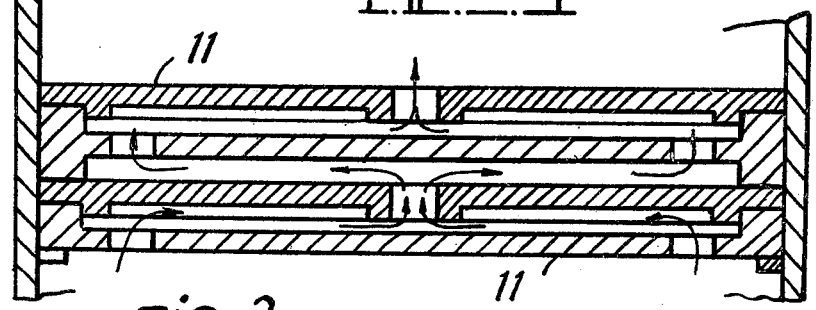
FIG. 2 is a sectional view of the perforated diaphragm of the metering device.

The metering device according to the invention is indicated generally at 1. It comprises a container 2 which is provided at the top with an inlet fitting for the carrier liquid, e.g. tap water, and with an inlet fitting 4 for the gas to be metered, or mixed, such as sulphur dioxide. The reference numerals 5 and 6, and respectively 7 and 8, denote shut off solenoid valves and filter elements. The numeral 9 denotes the inlet duct for the gas to be metered into the container 2, said duct being bent toward the center and then upwards, and terminating with an injector 10 for the gas to be metered. At 11, there are indicated perforated diaphragm elements, which are arranged as a battery-like set, and are visible in FIG. 2 to an enlarged scale. The container 2 is provided at its top with a relief and venting overflow 12, and at its bottom with a discharge outlet 13 including a metering pump 14 with a delivery pipe 15 for the metered solution.

The metering pump 14 is of the type having a variable rate of flow. The delivery pipe 15 delivers the metering solution into the stream of the fluid to be treated such as must.

The numeral 16 denotes a rod-like support for floats 17 and 17a which serves to monitor the level of the carrier liquid, i.e. of the solution, within the container 2. The position of minimum level and that of maximum level of the liquid and floats are respectively indicated with a full line and a dotted one. The floats 17 and 17a are provided with reed switches. The numeral 18 denotes the rod-like support of the float 19 serving to monitor the solution density. This float, according to the invention, has weight and volume such as to be in neutral hydrostatic equilibrium whenever the solution has a density which corresponds to the desired concentration. The numeral 20 denotes a photocell switch for monitoring the displacement of the float 19.

Figure 1:
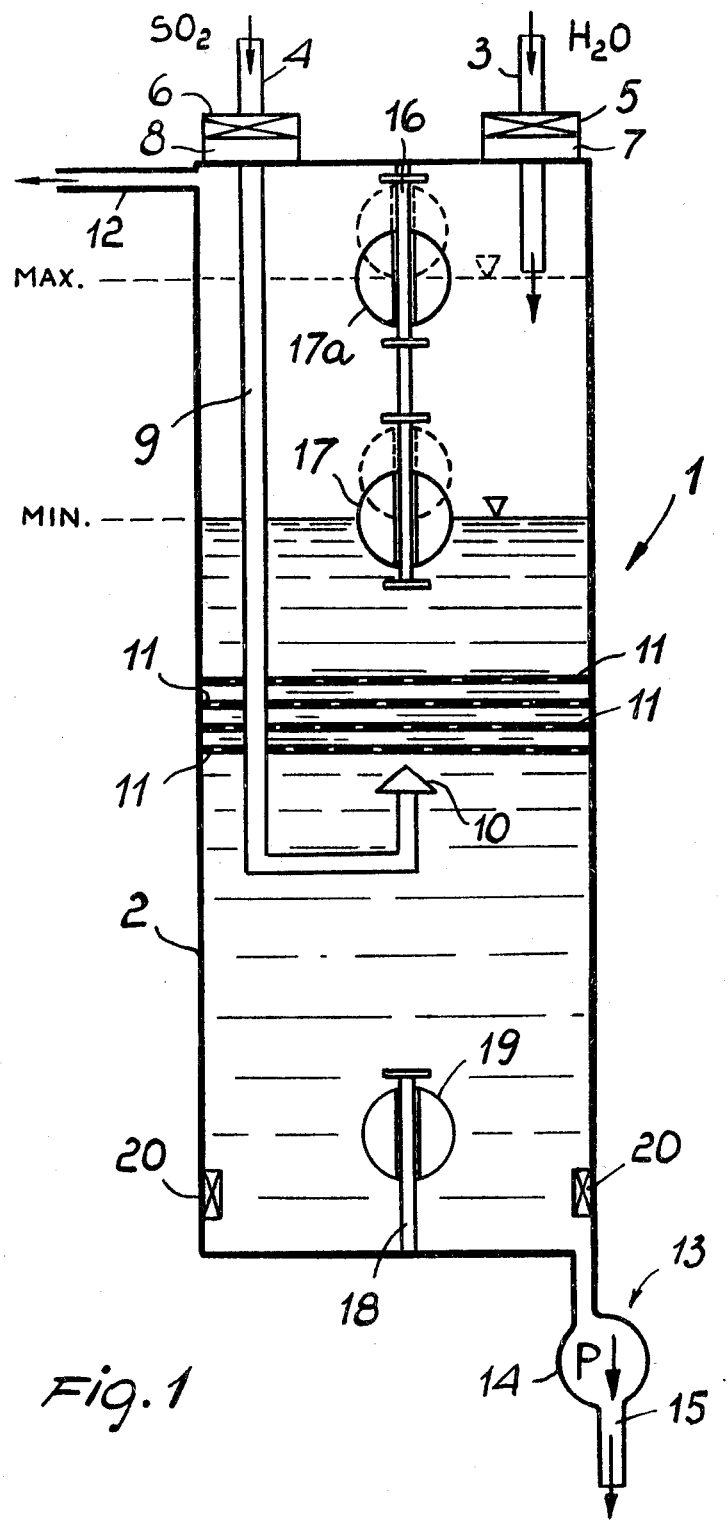
FIG. 1 is a schematic view, in vertical section, of an embodiment of the metering device according to this invention.
Figure 3:
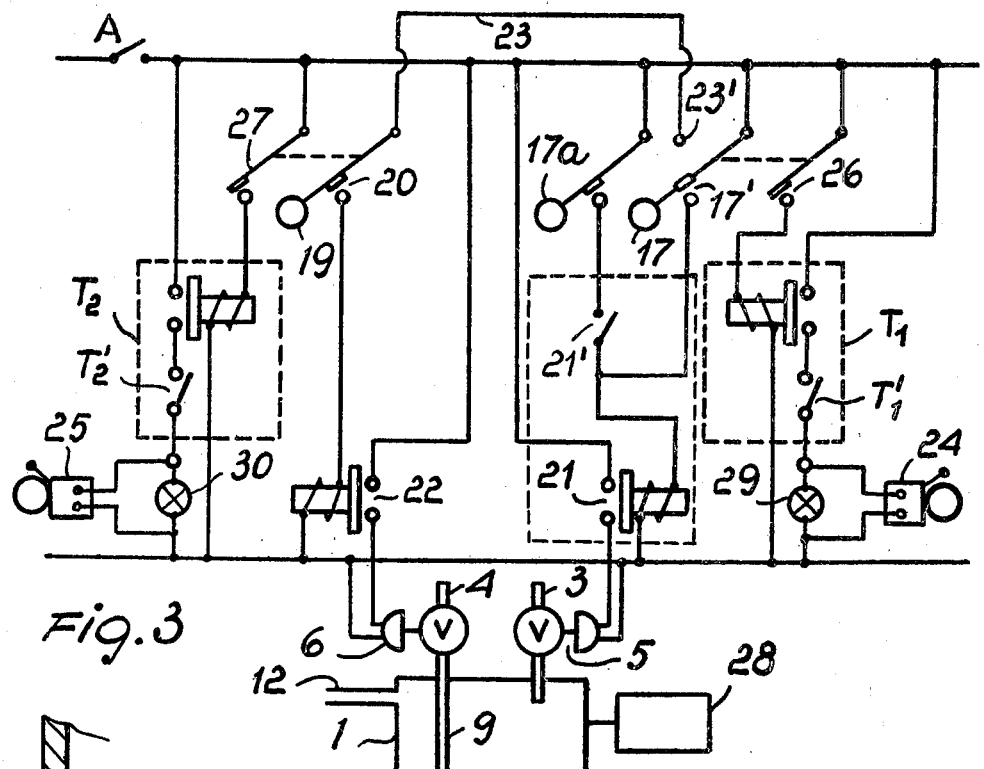
FIG. 3 shows schematically an electric circuit for automatically controlling the device.

An exemplary embodiment of the control circuitry from the switches to the solenoid valves is schematically illustrated in FIG. 3.

This comprises a master switch A, relays 21 and 22 for energizing the solenoid valves 5 and 6, respectively, the relay 21 being in turn energized by reed switches 17 and 17a, while the relay 22 is energized by the switch 19, 20, which is shown in the diagram, for simplicity, with a symbol similar to the reed switches. 21' is a retention contact which closes and opens with the energization and deenergization of relay 21. The circuitry further comprises a safety shunt the function whereof will be explained hereinafter, and two acoustical and optical indicators 24,29 and 25,30, with related timers $T_1$ and $T_2$ and related switches 26 and 27, respectively, mechanically connected to the switches 17 and 19, respectively.

The metering device with integral mixer according to the invention operates as follows.

As the master switch A is closed, the container 2 being empty, the reed switches with the floats 17,17a being depressed will close the related contacts, thereby the solenoid valve 5 is controlled to open and the carrier liquid admitted. The float 19 will now be in a lowered or depressed position at the bottom of the container 2, thereby the photocell switch 20 closes to control the opening of the solenoid valve 6 and admit the sulphur dioxide or gas to be metered. Through the injector 10 and diaphragm elements 11, the gas to be metered is uniformly distributed throughout the carrier liquid, thereby density of this latter will begin to increase. As the water level raises, first the switch 17 opens, while the solenoid valve 5 remains energized or in its open position, owing to the depressed position of the switch 17a. Upon the maximum level being reached, the reed switch of the float 17a is lifted and opened to cause the solenoid valve 5 to be de-energized, i.e. closed, and the inflow of carrier liquid to be shut off. If the $SO_2$ concentration is low, the solenoid valve 6 is still held energized, i.e. open, and the switch 20 closed, thereby the admittance of sulphur dioxide is maintained, with attendant increase of the mixture density. As the desired density is reached, i.e. upon reaching the upper threshold density, the float 19 will move to its upper position thereby, through the switch 20 being opened, the solenoid valve 6 is closed, or de-energized. At this time, the delivery may be started of the solution to be metered at the desired concentration of sulphur dioxide. The delivery is effected by actuating the pump P either manually or mechanically, this depending upon the requirements of the system portion located downstream of the metering device. The delivery flow rate is at all times lower than the supply flow rate of the carrier liquid through the inlet 3. The delivery action will cause the level to drop, and upon reaching a predetermined level height, the reed switch of the float 17a will close, thus causing the solenoid valve 5 to open by energizing it through the closing of the relay 21. By admitting fresh carrier fluid, a slight dilution of the solution will occur, with an attendant lowering of the sulphur dioxide concentration and thus of the solution density. Upon reaching the lower threshold density, the float 19 will move downwards, and the consequent closing of the switch 20 will cause the relay 22 to be energized, thereby the solenoid valve 6 opens to admit sulphur dioxide. This brings about an increase in density and consequent raising of the float 19, opening of the switch 20, de-energization of the relay 22, and closing of the solenoid valve 6. This cycle is repeated continuously throughout and the desired period of operation of the metering device, during which time a solution to be metered is supplied having virtually constant concentration. The solubility of sulphur dioxide in water is such that the dissolving step is very quickly carried out, thereby the entering fresh water immediately dissolves the sulphur dioxide and the concentration is thus maintained practically constant both in the area of the float and of delivery. In the foregoing example, as the physical parameter indicative of the concentration of the gas to be metered in the carrier fluid, use has been made of the density of the solution to be metered, although in actual practice other physical parameters could be utilized, such as refraction, electrical conductivity, or the dielectric nature of the solution, etc. Then, the float would have to be replaced by equivalent parameter detectors to suit the particular choice.

From the foregoing description, it will be apparent that the illustrated metering device, for automatically mixing a gas to be metered with a carrier liquid, in particular sulphur dioxide and water, fully achieves the objects mentioned in the preamble, and affords all of the cited advantages.

Figure 5:
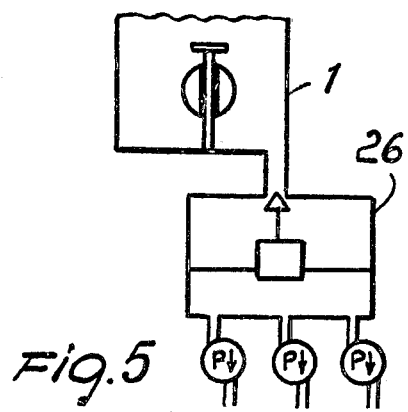
FIG. 5 shows schematically another variation of the same device.

In practicing the invention, and as illustrated in FIG. 5, the mixer according to the invention could also be used in combination with a tank or reservoir 26 of a conventional system, in which tank the solution to be metered may be stored prior to being extracted by the metering pumps P. This affords the advantage that the existing system tank need not be replaced with a larger capacity one in the event of the existing tank being inadequate. The tank 26 may be advantageously provided with a float valve 27 to control the delivery of the solution to the metering device 1 according to the level of the liquid in the tank 26.

Figure 4:
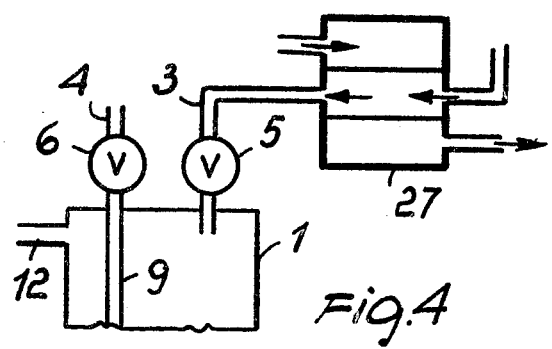
FIG. 4 shows schematically a variation of the instant metering device.

By exploiting the known fact that a solution of $SO_2$ in water is stable as concentration is increased and the water temperature is decreased, according to a further embodiment of this invention illustrated in FIG. 4, by passing the water first through a cooler 27, effective to reduce its temperature down to a value approaching 0° C., it becomes possible to form $SO_2$ solutions of higher concentration than with tap water.

Furthermore considering that the instant metering devices as illustrated are used for on-line metering (with the solution to be metered being injected at constant flow rate in the liquid whereto the gas to be metered has to be admixed, also at constant flow rate), and that the concentration therein is practically constantly equal to a predetermined value, use can be made, to determine the delivery rate of the metering pump, of a single cartesian graph (showing a set of curves), or of a single chart, which may be displayed on a plate 28 (FIG. 3) attached to the metering device itself. In prior art systems, by contrast, to determine the delivery rate three quantities have to be taken into consideration as the input data: the concentration of the solution, flow rate of the fluid whereto the sulphur dioxide is to be admixed, the amount of sulphur dioxide (e.g. in ppm) to be added, and a computation is to be made, or alternatively several charts are to be used. In actual practice, the device may be completed by providing, for example, an alarm 23,24 which, should the solution to be metered stay at a lower level than the minimum one for a longer time than a predetermined lapse, would indicate this anomaly, namely shortage of carrier fluid, to the operator, either through acoustical means 24 or a display 29. Similarly, an alarm circuit 23, 25 may indicate the solution density sensing float 19 staying in its low position (lean concentration) for a time exceeding a given time. This evidencing that the sulphur dioxide does not reach, or reaches in insufficient amount, the metering device inside.

The alarm circuitry operates as follows. Assuming that the master switch A is closed and the carrier liquid in the metering device is below the minimum level MIN, both switches 17 and 17a will be in their closed position, thus opening the solenoid valve 5, as described above. Upon the switch 17 being closed, the switch 26 will be closed simultaneously, as being mechanically connected to it, to energize the solenoid and circuit of the timer $T_1$, which will held the contact $T_1'$ open for a predetermined time. If within this time lapse the inflow of carrier liquid causes the liquid carrier level to raise sufficiently to lift the float 17 and open the related switch, the alarm will not become operative. If, on the contrary, the inflow of carrier liquid is discontinued or insufficient, the float 17 will remain depressed for a longer time than allowed for by the timer, thereby the contact $T_1'$ of this latter will close to energize the acoustical alarm (bell 24) and the visual one (lamp 29). The alarm system operates in a quite similar manner in the event of an insufficient inflow of sulphur dioxide, with the switches 20, 27 mechanically connected and timer $T_2$, $T_2'$ and bell 25 and lamp 30, thereby a detailed description of their operation is omitted herein.

In order to prevent sulphur dioxide from escaping to the surrounding atmosphere through the venting and overflow tube 12, the opening of the solenoid valve 6 may be linked to the raising of the level float 17, this avoiding, in the event of total lack of carrier fluid in the mixer, the drop of the float monitoring the density of the mixture to be metered causing a continuous opening of the solenoid valve 6 of the gas to be metered. This is made possible, for instance, by the shunt circuit 23, which supplies electric current to the switch 20 only if the float of the reed switch 17 is raised, i.e. the liquid in the metering device exceeds the minimum level, since upon the float 17 raising, the contact 17' is caused to contact the contact 23' of the shunt circuit feeding the switch 20. Otherwise, with the contact 17' lowered, i.e. separated from the contact 23', no current is supplied to the switch 20 and the sulphur dioxide delivery valve 6 stay closed until the level of the carrier liquid drops below the minimum, regardless of the operation of the switch 19, 20.

In practicing the invention, several modifications are possible. For example, the float 19 may be replaced with a float which has not neutral buoyancy, the same being composed of a body of considerable volume provided at the top with an upper rod-like portion projecting out of the solution, the height displacement of the free end of the rod-like portion with respect to the level of the solution indicating density variations; or optical signals could be provided, such as tell-tale lamps, indicating the various stages or operative situations; without in so doing departing from the scope of the invention.

All of the features to be inferred from the description, claims and drawing are considered to be substantial for the invention, either singly or in any combination thereof.

It should be noted that this invention contemplates two kinds of metering processes: a first kind in which sulphur dioxided is admixed and dissolved in water and a second kind of metering process in which metered quantities of the acqueous solution of sulphur dioxide are admixed to the must for treatment purposes.

Consequently, the invention should also be envisaged in a must treatment plant or system, which comprises in combination therewith an automatic metering device of the described kind for metering sulphur dioxide into water to provide required quantities of an acqueous solution of sulphur dioxide having a preestablished titer combined with the must treatment apparatus proper and including control devices for actuating the supply of sulphur dioxide solution from the automatic metering device to the must treatment apparatus proper.

I claim:

1. A system for controlling in a container the concentration and the restoration of a water solution of sulphure dioxide to be supplied from the container to the treatment of must, comprising said container having an inlet for water supply, an ingress for the supply of sulphur dioxide and a valve controlled discharge outlet for the water solution of sulphur dioxide formed in the container, first electromagnetic valve means at said inlet, said electromagnetic valve means opening said inlet when energized and closing the inlet when deenergized, first float means in said container buoyant in respect of any concentration of said water solution, said first float means having a maximum level float member and a minimum level float member, a first electrical circuitry having first electrical switch means operatively connecting said maximum and minimum level float members with said first electromagnetic valve means to alternatively energize and deenergize said first electromagnetic valve means when the level of said water solution reaches its preestablished minimum and maximum defining a minimum and a maximum level positions of said float members respectively, said first circuitry including a retention switch, thereby to energize, during the rise of the liquid solution level from said minimum upwards, said electromagnetic valve means when said minimum level float member exceeds upwardly the minimum level position thereof, while said maximum level float member is below the maximum level position thereof, and to deenergize said first electromagnetic valve means when also said maximum level float reaches its maximum level position and moreover to again energize, during the sinking of said liquid solution level, from said maximum level downwards, said electromagnetic valve means only when said minimum level float member reaches its minimum level position thereby to delay fluctuation of water supply into the container, second electromagnetic valve means at said ingress, second float means immersed in said water solution within said container, the hydrostatic action on said second float means urging upwardly said second float means into an uppermost position thereof when the concentration of said sulphur dioxide water solution exceeds a predetermined value and allowing said second float means to sink to a lowermost position thereof when the concentration is below said value, a second electrical circuitry connected with said first electrical circuitry and including second electrical switch means operatively connecting said second float means with said second electromagnetic valve means to energize them when the concentration of sulphur dioxide in the water solution is below said preestablished value and said second float means attain their lowermost position and to deenergize said second electromagnetic valve means whenever the concentration of sulphur dioxide in the water solution exceeds said preestablished value and said second float means attain their uppermost position, a protective shunt circuitry for preventing any supply of sulphur dioxide when the water solution level in the container is below said minimum, said protective shunt circuit preventing supply of electrical energy to said second electrical circuitry whenever said minimum level float member is below its minimum level position, thereby deenergizing said second electromagnetic valve means to shut off said ingress for sulphur dioxide and allowing supply of electrical energy to said second electrical circuitry whenever said minimum level float member is above its minimum level position, a first alarm circuitry operatively connected with said first float means to signal the lack of water supply whenever after a predetermined time delay said first float means remain in their minimum level position, and second alarm circuitry operatively connected with said second float means to signal the lack of sulphur dioxide supply whenever after a predetermined time delay said second float means remain in their lowermost position.

* * * * *